Sept. 3, 1968     T. E. LENIGAN     3,400,395
AMPLITUDE COMPARISON APPARATUS
Filed Jan. 29, 1952
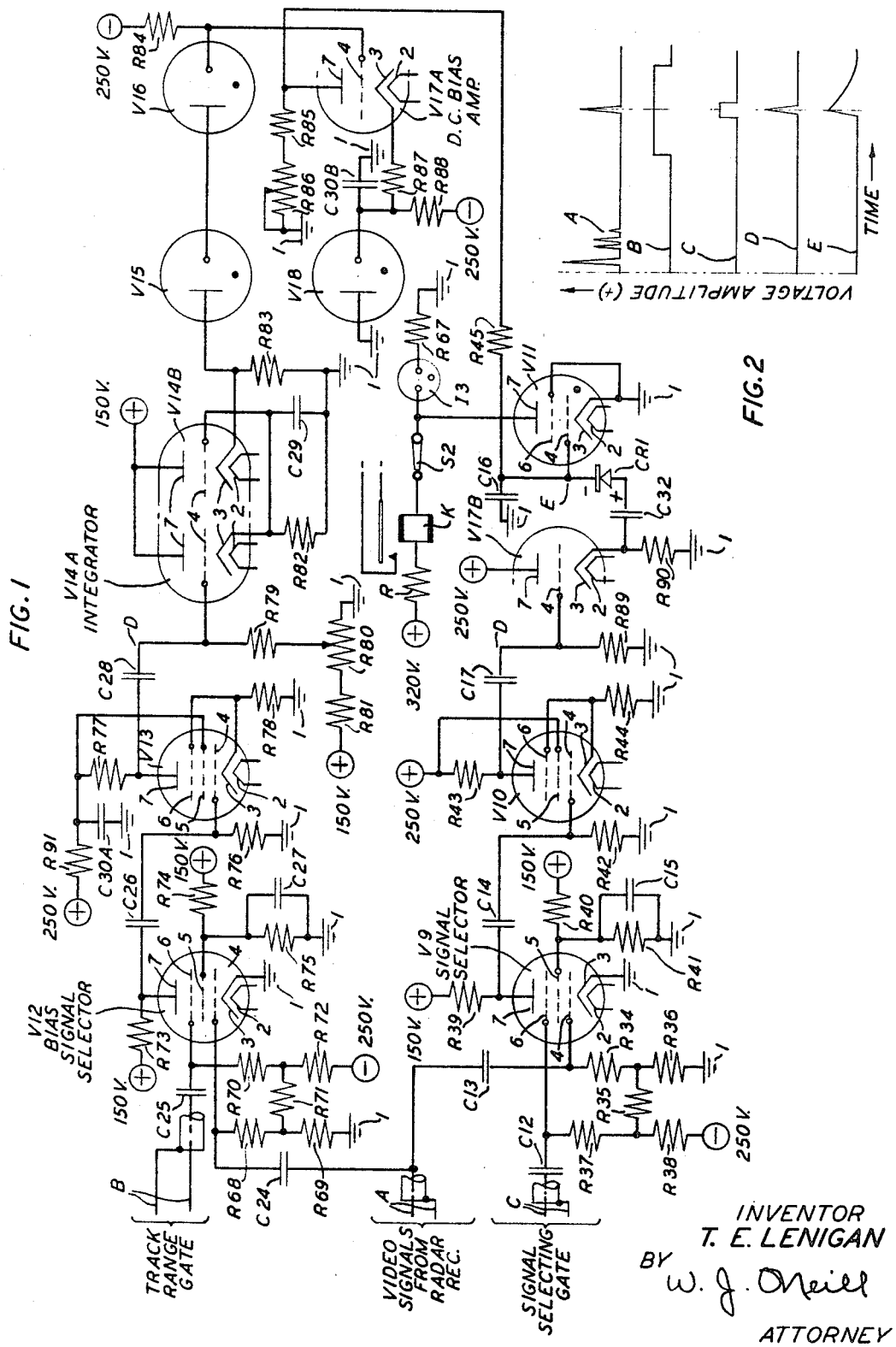
INVENTOR
T. E. LENIGAN
BY W. J. O'Neill
ATTORNEY United States Patent Office 3,400,395
Patented Sept. 3, 1968

3,400,395
AMPLITUDE COMPARISON APPARATUS
Thomas E. Lenigan, New Providence, N.J., assignor to Bell Telephone Laboratories, Incorporated, New York, N.Y., a corporation of New York
Filed Jan. 29, 1952, Ser. No. 268,751
7 Claims. (Cl. 343—17.1)

This invention relates to amplitude sensitive apparatus, and particularly to amplitude comparison apparatus which may be sensitive to rate of change in amplitude and which may be utilized in radar, radio and other electrical systems.

One of the objects of this invention is to provide apparatus which may be sensitive or responsive to predetermined rate of change in the amplitude of signal pulses or other voltage applied thereto.

Another object of this invention is to provide a rate of change type of amplitude discrimination.

Another object of this invention is to cause an amplitude sensitive device to respond to a selected rate of change in the amplitude of the signal voltage applied thereto, and not to respond to a different rate such as a slower rate of change in the amplitude thereof.

A particular object of this invention is to cause a device which is sensitive to the amplitude of radar signals returned from a shell in flight, to operate from the more rapid increase in such signal amplitude when returned from the shell burst, and not to operate from the less rapid changes in such signal amplitude when returned from the shell during its flight up to the time of its burst.

Another particular object of this invention is to generate automatically a signal for indicating the instant of shell burst by operating on the difference in ampiltude between the radar signal returned from the shell in flight as compared to that returned from the shell burst itself, and wherein the operation by the shell burst signal may be dependent upon the signal amplitude and rate of change thereof.

In radar systems, such as antiaircraft fire control radar systems for example, it is often desirable to provide a trial fire indicator system wherein means may be provided to discriminate between a radar signal returned from the shell burst and one returned from the shell in flight before its burst, thereby to permit the operation of an associated timing device by means of the radar signal returned from the shell burst only while preventing its operation by the radar signal returned from the shell in flight. In such an arrangement, the indicator system may operate in conjunction with the associated tracking radar which is used for tracking the shell in flight, in order to receive reflected radar signals not only from the shell up to the time of the shell burst but also from the burst at the time of the shell burst. The reflected radar signal so received from the bursting shell may be utilized to trigger an amplitude sensitive device such as a gaseous type trigger or switch tube which may be associated with the timing device, and thus by measuring the time from the firing of the shell to the triggering of the gas tube, the time interval to shell burst may be obtained and utilized as a check on the shell fuse performance in trial fire.

The radar signals returned from the shell in its flight before the shell burst being of lesser amplitude than that received from the shell burst itself, means may be provided to distinguish and discriminate between these two general levels of amplitudes of signals, thereby to permit the operation of the timing device at the time when the radar signal of larger amplitude is returned from the shell burst while preventing its operation when the radar signal of lesser amplitude is returned from the shell in flight up to and before the time of shell burst. While the discrimination between such two general levels of signal amplitudes received may be made by operating on the difference in amplitude on a simple amplitude basis alone, as by manually setting the grid bias on the gas trigger tube associated with the timing device so that the amplitude of the radar signal returned from the shell in flight before its burst is not sufficient to trigger the gas trigger tube, such manual operation requires considerable skill and attention on the part of the operators, since the radar signals returned from the shell itself in flight are usually varying in amplitude up to and before the time of the shell burst, due to such factors as receiver gain; aspect to radar range, etc.

In accordance with a feature of this invention, means comprising an automatic biasing circuit may be provided which may render the system sensitive to rate of change in the amplitude of the signal voltage applied thereto, rather than to change in amplitude alone; and thus, in the particular application described herein, permit the operation of the associated timing device by means of the radar signal of rapid or relatively fast rate of change in amplitude returned from a shell burst while preventing its operation by the radar signals of less rapidly varying amplitude returned from the shell in flight before shell burst.

The automatic bias circuit referred to may generate a suitable biasing voltage on the control grid electrode of the gaseous trigger type switch tube to provide operation thereof in accordance with a rate of change discrimination in the amplitude of the applied signal. For this purpose, the time constant of a discriminator circuit associated with the bias voltage build-up in the automatic bias circuit may be made of a value which prevents the bias voltage from opposing the more rapid change in signal amplitude at the time of shell burst, but which opposes and cancels out the slower changes in the signal amplitude during the flight of the shell up to the time of the shell burst. Thus, in accordance with this invention, amplitude sensitive apparatus may be provided which comprises means for making it sensitive to rate of change in amplitude, rather than to amplitude alone, though a certain amount of the latter may also be present at the same time.

Accordingly, in accordance with this invention, the discriminator circuit may have a time constant sensitive to and discriminating respectively between a predetermined or relatively faster rate and the relatively slower rates of change in the amplitude in a source of variable amplitude video pulse signal or other voltage, and may be utilized to provide a control potential, such as a biasing potential, in response to one and not the other of the respective faster and slower rates of change in the amplitude of the applied source of variable amplitude voltage. The biasing potential may be a negative bias direct current potential derived from the source of variable amplitude positive pulse signal voltage. In accordance with the time constant of the discriminator circuit, the negative bias potential may be made to build up in the presence of the slower rates of change in the amplitude of the positive signal votlage applied thereto, and thus be utilized to oppose and cancel out the positive signal voltage, the predetermined faster rate of change in the amplitude causing no such canceling out of the positive signal voltage by the negative bias potential and thereby permitting the positive signal voltage to operate the associated gas trigger tube in response to the predetermined faster rate amplitude change only.

For a clearer understanding of the nature of this invention and the additional advantages, features and objects thereof, reference is made to the following description taken in connection with the accompanying drawing, in which like reference characters represent like or similar parts and in which:

FIG. 1 is a circuit diagram illustrating an amplitude comparison indicator system in accordance with this invention; and FIG. 2 is a graph illustrating voltage-time wave forms, curves A to E thereof representing the several wave forms at the various points A to E shown in FIG. 1.

Referring to the drawing, FIG. 1 is a circuit diagram illustrating amplitude comparison apparatus, as applied particularly to a trial fire indicator for a radar system for tracking a shell in flight. As illustrated in FIG. 1, the apparatus may comprise a source A of suitable positive video pulse signals which may be received from an associated radar receiver and which may be of varying amplitude as illustrated by curve A in FIG. 2, and means for supplying therefrom positive video pulse signal voltage, which may be of wave form as illustrated by curve E of FIG. 2 and which may be applied to point E at the input circuit control grid electrode 4 of a Thyratron or amplitude sensitive gaseous trigger type switch tube device V11, over a suitable video signal circuit channel which, as illustrated in FIG. 1, may comprise generally a signal selector gating tube V9, an amplifier tube V10, a cathode follower tube V17B, a condenser C32 and a crystal diode CR1. The gas trigger tube V11, when supplied at its input circuit E with such a positive signal voltage of sufficient magnitude, as derived from the source of positive signal voltage A, becomes conductive and functions in the manner of a switch device in order to thereby operate a suitable timing device circuit (not shown) which may be associated with the relay K in the plate 7 output circuit of the gas trigger tube V11.

The source of signal voltage A in FIG. 1 may provide short video pulses of positive signal voltage which may include those which represent received radar signals returned by a tracking radar from a shell in flight and its shell burst. Such signals, as illustrated by curve A of FIG. 2, may be of varying amplitude and thus exhibit relatively faster and slower rates of amplitude change as between signals returned from a shell and its shell burst represented in curve A of FIG. 2 by the voltage peaks following the large first peak which may represent the usual initial transmitter pulse.

As illustrated in FIG. 1, the signal circuit selector gating tube device V9 may comprise a pentode type vacuum tube V9 having a cathode electrode 3 which may be connected to ground 1 and which may be heated by a suitable cathode heater filament 2 energized by a battery or other suitable source of power supply (not shown); having an input circuit control grid electrode 4 which may be connected through a coupling condenser C13 with the source of video signals A and which also may be connected to a negative bias voltage, i.e., through resistors R34 and R36 associated with resistors R35 and R38 which may be connected to a suitable source of negative (—) power supply voltage as illustrated in FIG. 1; having a screen grid electrode 5 which may be connected to ground 1 through a resistor R41 shunted by a condenser C15 and which may be energized through a resistor R40 by a suitable source of positive (+) power supply voltage; having another grid electrode 6 which may be connected through resistors R37 and R38 to a suitable source of negative (—) power supply voltage and which also may be connected through a coupling condenser C12 to a suitable source of signal selecting gating voltage C which may be of wave form as illustrated by curve C of FIG. 2; and having an output circuit plate electrode 7 which may be energized through plate resistor R39 by a suitable source of positive (+) power supply voltage, and which may be connected through a coupling condenser C14 to the control grid input circuit 4 of the amplifier tube V10.

The amplifier tube device V10 may comprise a pentode type vacuum tube V10 having a cathode electrode 3 which may be connected through a resistor R44 to ground 1; having an input circuit control grid electrode 4 which may be connected through a grid resistor R42 to ground 1 and which also may be connected through the coupling condenser C14 to the output circuit plate electrode 7 of the gating tube V9 in order to receive negative pulse signal voltage therefrom; having a screen grid electrode 5 which may be energized by a suitable source of positive (+) power supply voltage; having a suppressor grid electrode 6 which may be connected to the cathode electrode 3; and having an output circuit plate electrode 7 which may be energized through resistor R43 with a suitable positive (+) power supply voltage, and which may be connected through a coupling condenser C17 with the input circuit control grid electrode 4 of the cathode follower tube V17B in order to supply to the latter at point D a positive video signal which may be of wave form as illustrated by curve D of FIG. 2.

The cathode follower tube V17B may comprise a triode type vacuum tube having a plate electrode 7 which may be energized by a suitable source of positive (+) power supply voltage; having an input circuit control grid electrode 4 which may be connected through a grid resistor R89 with ground 1, and which also may be connected through the coupling condenser C17 with the plate output circuit 7 of the amplifier tube V10 in order to apply positive video pulse signal voltage at point D to the input circuit 4 of the cathode follower tube V17B; and having a cathode electrode 3 which may be connected through a cathode resistor R90 with ground 1, and which also may be connected through the coupling condenser C32 and the crystal diode CR1 with the input circuit control grid electrode 4 of the gas trigger tube switch device V11 in order to apply positive video pulse signal voltage thereto at point E, as derived from the positive pulse signal source A.

As illustrated in FIG. 1, the gas trigger tube switch device V11 may comprise a gaseous type tetrode V11 having a plate electrode 7 which may be energized through a reset switch S2, relay K and resistor R by means of a suitable source of positive (+) power supply voltage, and which may be connected through a ready light I3 and resistor R67 to ground 1; having a suppressor grid electrode 6 which may be connected to a grounded cathode electrode 3; and having an input circuit control grid electrode 4 which may be connected through a condenser C16 to ground 1, which may be connected through the crystal type diode CR1 and the condenser C32 with the output circuit of the cathode follower tube V17B in order to receive positive pulse signal voltage therefrom at point E as derived from the positive pulse signal source A, and which may be also connected through a resistor R45 with the output of a biasing circuit amplifier tube V17A in order to receive negative direct current biasing voltage therefrom. In this arrangement, the gas trigger tube V11 is an amplitude sensitive device that becomes conductive and operates in response to the positive signal voltage derived from source A and applied at point E to the control grid electrode 4 thereof, and is prevented from operating when the negative biasing voltage applied thereto at point E from the tube V17A opposes and cancels out such positive signal voltage applied thereto from the video signal source A. The negative biasing voltage is provided by the biasing circuit tube V17A which may be controlled by a time sensitive circuit that is responsive to the rate of amplitude change in the positive signal voltage of the source A, as more fully described hereinafter.

As illustrated in FIG. 1, the automatic biasing circuit for the switch tube V11 may comprise generally a signal selector gating tube device V12, an amplifier V13, an integrator V14A, a cathode follower V14B, coupling tubes V15 and V16, and a direct current bias amplifier V17A provided with a voltage regulator V18.

The bias circuit signal selector gating tube V12 may, like the video signal circuit selector gating tube V9, comprise a vacuum type pentode having an input circuit control grid electrode 4 which may be connected through a coupling condenser C24 with the same source of positive video pulse signal voltage A, and which may be connected to negative bias voltage through resistors R68 and R69 associated with resistors R71 and R72 which may be connected to a suitable source of negative (−) power supply voltage as illustrated in FIG. 1; having a cathode electrode 3 which may be connected to ground 1; having a screen grid electrode 5 which may be energized through resistor R74 by a suitable source of positive (+) power supply voltage and which may be connected to ground 1 through a resistor R75 shunted by a condenser C27; having a third grid electrode 6 which may be connected through resistors R70 and R72 to a suitable source of negative (−) power supply voltage, and which may be connected through a coupling condenser C25 to a source of track range gate voltage B which may be of wave form as illustrated by the curve B of FIG. 2; and having an output circuit plate electrode 7 which may be energized through a plate resistor R73 by a suitable source of positive (+) power supply voltage and which may be connected through a coupling condenser C26 to the input circuit of the amplifier V13.

The amplifier tube V13 may comprise a vacuum type pentode having a cathode electrode 3 which may be connected to ground 1 through a resistor R78; having an input circuit control grid electrode 4 which may be connected to ground 1 through a grid resistor R76 and which may be connected through the coupling condenser C26 to the output circuit plate electrode 7 of the gating tube V12 in order to receive negative video pulse voltage therefrom, as derived from the signal source A and controlled by the gating tube V12; having a screen grid electrode 5 which may be energized through a resistor R91 connected to grounded condenser C30A, by a suitable source of positive (+) power supply voltage; having a suppressor grid electrode 6 which may be connected in a conventional manner with the cathode electrode 3; and having an output circuit plate electrode 7 which may be energized through resistors R77 and R91 by a source of suitable positive (+) power supply voltage, and which may be connected through a coupling condenser C28 with the input circuit control grid electrode 4 of the integrator tube V14A in order to supply positive video pulse voltage thereto which at point D may be of wave form as illustrated by curve D of FIG. 2, and which is derived from the positive video pulse signal source A.

As illustrated in FIG. 1, the integrator tube V14A may comprise a vacuum type triode having a plate electrode 7 which may be energized by a source of suitable positive (+) power supply voltage; having an input circuit control grid electrode 4 which may be connected through the coupling condenser C28 with the output circuit plate electrode 7 of the amplifier tube V13, and which may be connected to ground 1 through a grid resistor R79 and an adjustable bias resistance potentiometer comprising resistors R80 and R81 energized by a suitable source of positive (+) power supply voltage; and having an output circuit cathode electrode 3 which may be connected to ground 1 through a large resistance type resistor R82 shunted by an integrating condenser C29 having a time constant sensitive to and discriminating between relatively faster and slower rates of amplitude change in the voltage applied thereto, as derived from the signal source A.

The cathode follower device V14B may comprise a vacuum type triode V14B having an input circuit control grid electrode 4 which may be connected with the positive direct-current cathode output potential of the integrator tube V14A and its associated integrating condenser C29; having a plate electrode 7 which may be energized by a suitable source of positive (+) power supply voltage; and having a cathode electrode 3 which may be connected to ground 1 through a cathode resistor R83 and which may be connected to the input of coupling tube V15 followed by coupling tube V16. The coupling tubes V15 and V16 may be gaseous type voltage stabilizing tubes used as direct current coupling devices connected with the input circuit of the direct current bias voltage amplifier tube V17A.

As illustrated in FIG. 1, the direct-current negative bias type voltage amplifier V17A may comprise a vacuum type triode V17A having an input circuit control grid electrode 4 which may be connected with the output circuit of the gas stabilizer tube V16 and which may be connected through a grid resistor R84 with a suitable source of negative (−) power supply voltage; having a cathode electrode 3 which may be connected through a cathode resistor R87 to ground 1 through a gaseous type voltage regulator tube V18 provided with a shunting condenser C30B and a resistor R88 connected to a suitable source of negative (−) power supply voltage; and having an output circiut plate electrode 7 which may be connected to ground 1 through resistor R85 and an associated adjustable bias gain resistor R86, and which may be connected through the resistor R45 to the input circuit control grid electrode 4 of the gas trigger tube V11 in order to supply thereto from the tube V17A direct current negative biasing potential for opposing and canceling out the positive signal voltage supplied to the same tube V11 through the crystal diode CR1 from the video signal source A.

As an illustrative example in a particular case, the component elements of the circuit shown in FIG. 1 may have particular values as follows: The various tubes may comprise known tubes as follows: V9 and V12, 6AS6; V10, 6AQ5; V17B–1/2 of 12AU7; V11, 2D21; V13, 6AQ5; V14A–1/2 of 12AU7; V14B–1/2 of 12AU7; V15, 5651; V16, 5651; V17A–1/2 of 12AU7; and V18, OA2. The values of positive (+) and negative (−) power supply voltages for such tubes may be as indicated in FIG. 1, or other suitable values. The cathode heater filaments 2 of FIG. 1 may be heated by a 500-cycle or other suitable power supply source. For the present example, the resistance values of the resistors of FIG. 1 and the capacitance values of condensers of FIG. 1 may be roughly as follows, all values being expressed in ohms and micromicrofarads: resistors—R=10,000, R34=560,000, R35=8200, R36=5600, R37=560,000, R38=274,000, R39=2000, R40=10,000, R41=51,000, R42=270,000, R43=2500, R44=220, R45=100,000, R67=330,000, R68=560,000, R69=5600, R70=560,000, R71=3600, R72=274,000, R73=2000, R74=10,000, R75=51,000, R76=270,000, R77=2500, R78=220, R79=270,000, R80=10,000, R81=121,000, R82=10,000,000, R83=12,000, R84= 47,000, R85=6810, R86=5000, R87=7500, R88= 10,000, R89=270,000, R90=10,000, R91=100; condensers—C12=560, C13=560, C14=10,000, C15=1000, C16=51, C17=1000, C24=510, C25=100,000, C26= 10,000, C27=1000, C28=10,000, C29=1000, C30A= 250,000, C30B=250,000, C32=1000.

The wave forms at the various points labeled A, B, C, D and E in the circuit of FIG. 1 may be as illustrated by the several curves A, B, C, D and E, respectively, of FIG. 2, for the example mentioned above. The curve A of FIG. 2 may represent the voltage wave form of the positive (+) video pulse signals received and applied at the input source A of FIG. 1, the maximum amplitude being roughly of the order of about 5 volts in the example given. The curve B of FIG. 2 may represent the track range gate voltage wave form applied at point B of FIG. 1, the amplitude being for example about 10 volts for a time duration of about 30 microseconds. The curve C of FIG. 2 may represent the signal selecting gate voltage wave form applied at point C of FIG. 1, the amplitude being for example about 18 volts for a time duration of about 3 microseconds and always centered with respect to the track range gate voltage pulse of curve B as illustrated in FIG. 2. The curve D of FIG. 2 may represent the voltage wave form at point D of FIG. 1 at the inputs of each of the tubes V14A and V17B thereof, the maximum amplitude being for example about 60 volts. The curve E of FIG. 2 may represent the voltage wave form at the point E of FIG. 1 at the input of the gas trigger tube V11 thereof, the maximum voltage being for example about 55 volts in the example given.

The operation of the trial fire indicator system illustrated in FIG. 1 may be described as follows: The gaseous type trigger tube V11 is an amplitude sensitive switch device which is caused to respond to a predetermined faster rate of change in the amplitude of the video signal voltage applied at source A, but not to respond to a relatively slower rate of change in the amplitude thereof. This result is accomplished by causing the video signals from the source A to generate a bias potential with such polarity and magnitude at point E as to cancel the video signal at the same point E in response to the slower rates of amplitude change, but not in response to the predetermined faster rate of change in the amplitude of the signal from the source A. For this purpose, the signals applied at the input source A, which may be radar video pulse signals as received from a suitable radar receiver, are fed from the source A into two channels or paths in parallel. The first or signal channel comprising the electronic tubes V9, V10 and V17B and their associated components including the condenser C32 and the rectifier CR1, conveys a positive video signal from the source A to the control grid input electrode 4 at point E of the amplitude sensitive device V11. The second or biasing circuit channel comprising the electronic tubes V12, V13, V14A, V14B, V15, V16 and V17A and their associated components converts the video signal from the same source A to a negative direct current potential which is applied to the same control grid input electrode 4 at point E of the same amplitude sensitive device V11. The amplitude of this second channel negative bias potential at point E is made proportional to the amplitude of the first channel positive video signal voltage at point E. For this purpose, the gain of the second channel may be adjusted by means of the potentiometer resistor R86 so that it is just sufficient to prevent the video signal voltage at point E of the first channel from causing the amplitude sensitive tube V11 to conduct. An alternative method of gain control might be to allow the direct current gain to be fixed and instead to vary the gain of the video amplifier V13. Thus the input signal from the common input source A may be utilized to generate an opposing bias potential in the second channel with a polarity and magnitude such as to cancel the signal voltage in the first channel at the input point E of the amplitude sensitive device V11.

In the first channel, the positive video signal from the source A first passes through the gating amplifier tube V9 which may be utilized to eliminate unwanted extraneous signals from that channel, and is then amplified by the amplifier tubes V10 and V17B and thereafter is passed to point E at the control grid input electrode 4 of the Thyratron tube V11 with a positive polarity. The same positive video signal from the source A is also simultaneously applied to the second channel and, after the same corresponding amount of amplification in the tubes V12 and V13, is integrated in the cathode circuit of the integrator tube V14A comprising the parallel-connected resistor R82 and the integrating condenser C29. The resulting positive direct current potential across the integrating condenser C29 is then amplified and inverted in polarity by the direct current system comprising the tubes V14B, V15, V16 and V17A and their associated components. The resulting negative polarity direct current potential from the direct current bias amplifier tube V17A is connected through the resistor R45 to the same control grid input electrode 4 of the tube V11 in order to oppose the positive video signal polarity there applied at point E from the first channel. If this positive video signal voltage increases in amplitude faster than the negative bias potential can increase in amplitude, the amplitude sensitive tube V11 will become conductive and operate the relay K. But, if this negative bias potential increases in amplitude at the same rate as that of the positive video signal voltage so as to follow along with it, the amplitude sensitive tube V11 will not become conductive or operate. The rate of the amplitude build-up of this negative bias potential in the second channel or bias circuit is governed by the impedance of the integrator tube V14A therein and the capacitance value of the associated integrating condenser C29, and may also be changed by the insertion of additional resistance between the condenser C29 and the tube V14A. The time constant of this bias potential build-up thus determines the minimum rate of change in signal voltage amplitude required to cause the amplitude sensitive tube V11 to operate.

In this second channel, which as illustrated in FIG. 1 is the biasing circuit path, the positive video pulse signal voltage received from the source A first passes through the gating amplifier tube V12, which may be utilized to eliminate unwanted extraneous signals from that channel, and is then amplified by the amplifier tube V13 and appears as a positive signal voltage on the control grid electrode 4 of the integrator tube V14A. During the time interval of this pulse signal, which may be for example of the order of about 0.25 microsecond, the impedance of the tube V14A is reduced and a charge is placed on the integrating condenser C29. The condenser C29 has a much slower discharge path through the high resistance of resistor R82 and consequently successive repetitions of the pulse signal may build up the positive direct current potential across the condenser C29 until it is approximately equal to the peak video signal amplitude. The time constant of this direct current positive potential is determined by the impedances of the condenser C29 and the tube V14A, and may be adjusted so that the positive direct current potential built up across the condenser C29 can follow the normal or slower rates of change in the video signal amplitude from source A and thus prevent the gas tube V11 from operating, but not be able to follow a predetermined more rapid increase or rate of change in the video signal amplitude and thus not be able to prevent the gas tube V11 from operating. Such slower rates of change in the video signal amplitude may be the normal radar signal amplitude changes returned from a shell in flight, and such predetermined more rapid increase in the video signal amplitude may be a shell burst signal which the build-up potential across the condenser C29 is unable to follow, thus permitting the gas tube V11 to conduct and operate the relay K for indicating through suitable auxiliary apparatus (not shown) the instant of such shell burst.

The positive video pulse signal voltage from the source A is connected through the coupling condenser C24 to the control grid electrode 4 of the gating tube V12, and the positive gate voltage from the source B, which may be for example a 5000-yard gate voltage from the associated track range unit (not shown), is applied to the third grid electrode 6 of that gating tube V12. This gate voltage may be generated in such a manner that it is always centered as for example about a 500-yard gate voltage above a 2000-yard range and may be set by means of a predetermined range unit setting for trial fire. When the positive shell signal voltage from source A enters this gate at tube V12, it is amplified by the gating tube V12 and by the amplifier tube V13. The positive video signal voltage from the plate electrode 7 of the amplifier tube V13 is then integrated at the cathode 3 of the integrator tube V14A. When the positive video signal voltage from the tube V13 drives the grid electrode 4 of the integrator tube V14A positive, the cathode 3 thereof attempts to follow with a time constant determined by the capacitance of the condenser C29 and by the impedance of the tube V14A. It requires a number of signal repetitions as for example from 10 to 15 signal repetitions to increase the voltage charge on the condenser C29 by an amount equal to the peak video voltage on the grid electrode 4 of the tube V14A. The discharge time for the integrating condenser C29 is largely determined by the resistance value of the resistor R82. The voltage across the integrating condenser C29 is a direct current positive potential which is subsequently inverted in polarity in order to negatively bias the gas trigger tube V11 and which is controlled in bias voltage gain in order to equalize differences in gain due to variations between the negative bias and positive video channels both separately applied to the control grid electrode 4 of the gas trigger tube V11. The variation in the positive direct current potential across the integrating condenser C29 is reproduced at the cathode 3 of the cathode follower tube V14B, and the positive potential at this latter point is coupled to the negative potential at the control grid electrode 4 of the inverting direct current bias amplifier V17A through the two series-connected gaseous voltage-stabilizing direct current coupling tubes V15 and V16 each of which may have for example a voltage drop of about 87 volts or a total of about 174 volts. The negative plate supply voltage of the inverting amplifier tube V17A may be regulated by the voltage regulator tube V18 and applied to the cathode resistor R87. The plate resistor R85 of the amplifier tube V17A may be returned to ground 1 through the potentiometer R86 which may serve to vary and adjust the direct current gain of this negative biasing channel or circuit. The negative direct current voltage at the plate electrode 7 of the amplifier tube V17A is connected to the control grid electrode 4 of the gas trigger tube V11 through the resistor R45. A reset switch S2 and a neon ready light I3 may be added. The reset switch S2 opens the plate supply circuit 7 of the gas tube V11 to allow the control grid electrode 4 thereof to recover control of the tube V11. The ready light I3 connected in parallel with the plate 7 and cathode 3 of the gas trigger tube V11 is illuminated when this tube is not conducting and ready for trial fire.

In order to insure that the bias circuit voltage may be generated by and in response to the shell and burst signals only, and not by the associated radar transmitter pulse and its nearby ground clutter, the gating tube V12 may be utilized to gate the bias circuit. For this purpose, the range unit of the associated radar (not shown) may have an output pulse applied at point B in FIG. 1, designated in FIG. 1 "Track Range Gate," that may correspond for example to 5000 yards in length as illustrated by curve B of FIG. 2, and that by system adjustment may be always centered in a known manner about a 500-yard pulse, for example, as illustrated by curve C of FIG. 2, which may generate the sweep in the associated radar (not shown) and also be applied at point C in FIG. 1 to the gating tube V9 in order to gate the video channel to the gas trigger tube V11.

According, the bias generating circuit of FIG. 1 may be designed with the video input thereto from the source A gated by the gating tube V122 having its third grid electrode 6 connected to the track range gate B. With this arrangement of bias channel gating, an adjustable no-signal bias voltage may be fed initially to the input grid electrode 4 of the gas trigger tube V11 of FIG. 1, and the associated track range unit (not shown) may be set at the range where shell burst should occur. As the shell travels out in range, the received signal enters the 5000-yard track range gate at B as referred to above and permits the negative bias voltage on the gas trigger tube V11 to increase to a value that will prevent the video signal voltage from source A from tripping the gas tube V11 by the time it enters the 500-yard gate at C referred to. When the shell burst occurs, the bias circuit voltage by reason of the time constant of the bias circuit at R82, C29 is unable to follow the then rapid or faster rate of rise in the signal voltage amplitude from source A and the gas tube V11 is then triggered by the then unopposed positive signal voltage at point E on the input circuit 4 thereof. The automatic bias voltage, resulting from the shell signal as received at source A, is made just sufficient in amplitude to prevent that shell signal voltage from tripping the gas tube V11 at any gain setting, but is made unable to follow the more rapid increase in amplitude at the time when the shell burst occurs, thus allowing the burst signal to trip the gas tube Thyratron V11 and thereby cause the relay K to operate a suitable associated timing device.

The video signal channel may also be gated by applying the 500-yard pulse referred to above to the source C connected to the third grid electrode 6 of the gating amplifier tube V9 so that only a signal from the video signal source A coinciding in range with the position of such gate at C can reach the gas trigger tube V11 over the video signal channel including the tubes V9, V10 and V17B. Such a 500-yard pulse for gating purposes may be received at C in a known manner, as from an associated pulse demodulator unit (not shown) wherein the time mark received from the track range unit (not shown) may initiate the 500-yard gate pulse which may be used at C to gate the video signal channel at the gating tube V9, so that only video signals from the source A coinciding in range with the position of the gate at C can be passed through the gating tube V9 to the inverting amplifier tube V10 and finally to the gas trigger tube V11.

The operation of the gas trigger tube V11 may be improved by stretching the video signal, as illustrated by the curve E of FIG. 2, and applying it at the point E to the control grid electrode 4 thereof. This stretching effect may be obtained by utilizing the grid-to-ground condenser C16 and the series-connected crystal diode CR1. To prevent this capacitance load C16 from degrading the high frequency response of the amplifier tube V10, the cathode follower tube V17B may be inserted.

As utilized in a trial fire indicator of a radar system for tracking a shell in flight, the indicator circuit of FIG. 1 permits the operation of the relay K and its associated timing device (not shown) in response to a tracking radar signal received at the source A when returned from the shell burst, and prevents its operation by the tracking radar signal received at the source A when returned from the shell in flight before and up to the time of shell burst. The indicator circuit of FIG. 1, when receiving a reflected signal as source A from the bursting shell, causes this signal to trigger the gas tube V11 and thus operate the relay K and its associated timing device. By measuring the time from the firing of the shell to the firing of the gas tube V11, the time interval to shell burst may be obtained as a check on the shell fuse perforance. A radar signal of lesser but varying amplitude is received from the shell in its flight before the burst. To distinguish between these two levels of amplitudes of different relative magnitudes and particularly of different rates of amplitude change, the automatic biasing circuit comprising the tubes V12 through V18 of FIG. 1, generates opposing negative bias voltage on the control grid electrode 4 of the gas tube V11 of such magnitude that it is just sufficient to prevent triggering of the gas tube V11 over a wide range of shell signal amplitudes, and results in a rate of change discrimination between the more rapid amplitude change and the less rapid amplitude change in the signals returned from the shell and its burst respectively. This rate of amplitude change discrimination between such relatively faster and slower rates of amplitude change is accomplished in the circuit of FIG. 1 by providing a suitable time constant for the condenser C29 and the impedance of tube V14A, which controls the negative bias voltage build-up from the tube V17A in a manner to prevent such negative bias voltage from opposing the more rapid amplitude change in the signal received at the source A at the time of the shell burst, and to permit such bias voltage to oppose and cancel out the slower amplitude changes in the signal received at source A during the flight of the shell. Accordingly, the amplitude comparison apparatus of FIG. 1 comprises means sensitive to a rate of amplitude change rather than to amplitude alone.

The measurement of the time interval between the firing of the shell from the gun and its burst may be made in a known manner on an associated computer unit (not shown). The firing key at the gun starts the computer timing. The rapid increase in signal amplitude received at source A when the shell burst occurs causes the gas tube V11 to conduct and operate to stop the computer timing.

While this invention has been described particularly in connection with a trial fire indicator for a fire control radar system, it will be understood that it may be utilized in other radar applications or systems, and also in non-radar systems such as radio systems, wire or carrier systems, or other systems.

Although this invention has been described and illustrated in relation to specific arrangements, it is to be understood that it is capable of application in other organizations and is therefore not to be limited to the particular embodiments disclosed.

What is claimed is:

1. Apparatus comprising an amplitude sensitive gaseous tube device having a control grid electrode, a source of variable amplitude positive pulse voltage exhibiting relatively faster and slower rates of amplitude change, and means comprising first and second parallel-connected transmission paths connecting said positive voltage source to said gaseous device control grid electrode, said first path comprising means for transmitting said positive source voltage to said gaseous device control grid electrode for causing said gaseous device to operatively conduct in response to said relatively faster rate of amplitude change in said positive source voltage, and said second path comprising means for preventing said gaseous device from operatively conducting in response to said relatively slower rate of amplitude change in said positive source voltage, said second path means including means responsive to said source voltage comprising integrator means having a time constant sufficient for discriminating between said respective faster and slower rates of amplitude change in said positive pulse source voltage and means responsive to said integrator means for generating at said gaseous device control grid electrode sufficient negative bias potential in response to said slower rate but not in response to said faster rate of amplitude change in said source voltage for substantially canceling the effect of said positive pulse source voltage at said gaseous device control grid electrode in response to said negative bias potential.

2. Apparatus comprising an amplitude sensitive gaseous tube device having a control grid electrode, a source of variable amplitude positive pulse voltage exhibiting relatively faster and slower rates of amplitude change, and means comprising first and second parallel-connected transmission paths connecting said positive voltage source to said gaseous device control grid electrode, said first path comprising means for transmitting said positive source voltage to said gaseous device control grid electrode for causing said gaseous device to operatively conduct in response to said relatively faster rate of amplitude change in said positive source voltage, and said second path comprising means for preventing said gaseous device from operatively conducting in response to said relatively slower rate of amplitude change in said positive source voltage, said second path means including means responsive to said source voltage comprising integrator means having a time constant sufficient for discriminating between said respective faster and slower rates of amplitude change in said positive pulse source voltage, said integrator means comprising means including a condenser for integrating said positive pulse source voltage into direct current positive potential across said condenser and means responsive to said integrator means for generating at said gaseous device control grid electrode sufficient direct current negative bias potential derived from said direct current positive potential across said condenser in response to said slower rate but not in response to said faster rate of amplitude change in said source voltage for substantially canceling the effect of said positive pulse source voltage at said gaseous device control grid electrode in response to said negative bias potential.

3. Apparatus comprising an amplitude sensitive device, a source of variable amplitude signal voltage of one polarity, and means comprising first and second parallel-connected transmission paths connecting said source to a common input electrode of said device for causing said device to operatively conduct in response to a predetermined relatively fast rate of change in said amplitude of said signal voltage and not to operatively conduct in response to a substantially slower rate of change in said amplitude thereof, said first path comprising means causing said device to so conduct in response to said predetermined faster rate of change in said amplitude of said signal voltage, and said second path comprising means permitting said device to so conduct in response to said predetermined faster rate of change in said amplitude of said signal voltage while preventing said device from so conducting in response to said slower rate of change in said amplitude thereof, said second path means comprising a source of bias voltage derived from and of opposite polarity to that of said source signal voltage and having a magnitude at said common input electrode of said device sufficient to oppose and cancel the effect of said signal source voltage at said common input electrode of said device as transmitted at said slower rate of change in said amplitude of said source signal voltage to said device over said first path.

4. Apparatus comprising an amplitude sensitive gaseous type trigger tube switch device having a control electrode, a source of variable amplitude pulse signal voltage of positive polarity, and means comprising first and second parallel-connected transmission paths connecting said source to said gaseous device control electrode for causing said gaseous device to respond to a relatively rapid rate of increase in amplitude in said source voltage but not to respond to substantially slower rates of amplitude change therein, said first path comprising means for amplifying and transmitting said positive source voltage to said gaseous device control electrode, and said second path comprising means for amplifying and causing said positive source voltage to respond to said slower rates of amplitude change therein and generate direct current negative bias potential of sufficient magnitude at said gaseous device control electrode to oppose and cancel the effect of said positive source voltage transmitted thereto over said first path, said last-mentioned means comprising integrator means including an electronic tube having a cathode output circuit comprising an integrating condenser and a resistor disposed in shunt therewith for integrating said positive source voltage in said cathode output circuit and providing direct current positive potential across said condenser in response to said slower rates of amplitude change, the time constant rate of build-up for said positive potential across said condenser being a value in accordance with the impedance of said electronic tube, the capacitance of said condenser and the resistance of said resistor, said value determining the minimum rate of amplitude change in said source voltage required to cause said gaseous device to operate in response to said positive source voltage over said first path increasing in amplitude faster than said positive potential across said condenser can increase in amplitude, and means comprising electronic devices responsive to said positive potential across said condenser for amplifying and inverting said positive potential into said negative bias potential in response to said slower rates of amplitude change.

5. Apparatus in accordance with claim 4, said source comprising a source of radar video pulses returned from a shell in flight and its burst, said rapid rate of increase in amplitude corresponding to said pulses returned from said shell burst, said slower rates of amplitude change corresponding to said pulses returned from said shell, and said first and second paths each comprising electronic gating tube means for substantially eliminating unwanted radar signals from said respective paths.

6. In a radar operated trial fire indicator system generating a radar signal for indicating the instant of shell burst by operating on the difference in rates of amplitude change between the radar shell signal returned from the shell as compared to the radar shell burst signal returned from the shell burst, apparatus comprising a source of variable amplitude shell burst and shell signals of positive video pulse voltage, an amplitude sensitive gaseous type trigger tube switch device conductively operative in response to positive voltage of sufficient magnitude applied to the input control circuit thereof, a video burst transmission circuit channel connecting said source with said gaseous device input circuit comprising means for operating said gaseous device in response to said shell burst signals of said positive video pulse voltage source, and a biasing transmission circuit channel connecting said source with said gaseous device input circuit comprising means for generating a direct current negative bias potential derived from and sensitive to the magnitude and the rate of change in amplitude of said variable amplitude positive video pulse voltage of said source and of sufficient negative amplitude to oppose and prevent said operation of said burst circuit gaseous device in response to said shell signals of said source but not in response to said burst signals thereof.

7. Apparatus in accordance with claim 6, said video burst circuit channel comprising an electronic gating device having an input electrode connected with said source of positive video pulse signals and having another input electrode connected with a source of positive gating voltage of predetermined range length value for eliminating unwanted signals from said video burst circuit channel, an electronic amplifier device having an input circuit connected with the output circuit of said gating device, a series-connected crystal diode connecting the output circuit of said amplifier device with said input circuit of said gaseous switch device for applying unidirectional positive video pulse signal potential thereto, and a capacitance load connected between said gaseous device input circuit and ground, and said biasing circuit channel comprising an electronic gating device having an input electrode connected with said source of positive video pulse signals and having another input electrode connected with a source of positive gating voltage of predetermined range length value for eliminating unwanted signals from said biasing circuit channel, an electronic integrator device having an input electrode connected with the output circuit of said gating device and having a cathode ouptut circuit connected with an integrating condenser charged by the positive video pulse shell signal voltage received from said last-mentioned input electrode and a resistor shunted across and controlling the discharge time of said integrating condenser for integrating said positive video pulse shell signal voltage in said cathode circuit, an electronic cathode follower device having an input electrode connected with said integrating condenser and having a cathode output electrode reproducing the variation in direct current positive potential across said integrating condenser, and an electronic inverting amplifier device having a negative potential input electrode connected with said cathode follower device cathode electrode for inverting in polarity said direct current positive potential received from across said integrating condenser, having a plate output electrode connected to said input circuit of said gaseous switch device for applying direct current negative bias potential thereto, and having a plate supply circuit potentiometer for controlling the gain of said negative bias potential to equalize differences between the respective negative and positive potential gains in said biasing circuit channel and said video burst circuit channel respectively.

References Cited
UNITED STATES PATENTS

| | | | |
|---|---|---|---|
| 2,250,132 | 7/1941 | Parr | 250—20.52 |
| 2,250,144 | 7/1941 | Welty | 250—20.52 |
| 2,252,066 | 8/1941 | Dallos | 250—20.52 |
| 2,426,182 | 8/1947 | De Lange | 343—11 |
| 2,463,233 | 3/1949 | Alexanderson | 343—5 |
| 2,562,309 | 7/1951 | Fredrick et al. | 343—13 |

RODNEY D. BENNETT, *Primary Examiner.*

NORMAN H. EVANS, *Assistant Examiner.*